Feb. 11, 1964  E. FISCHER  3,120,855
ANTI-SIPHON BALL COCK ASSEMBLY
Filed May 31, 1961  2 Sheets-Sheet 1
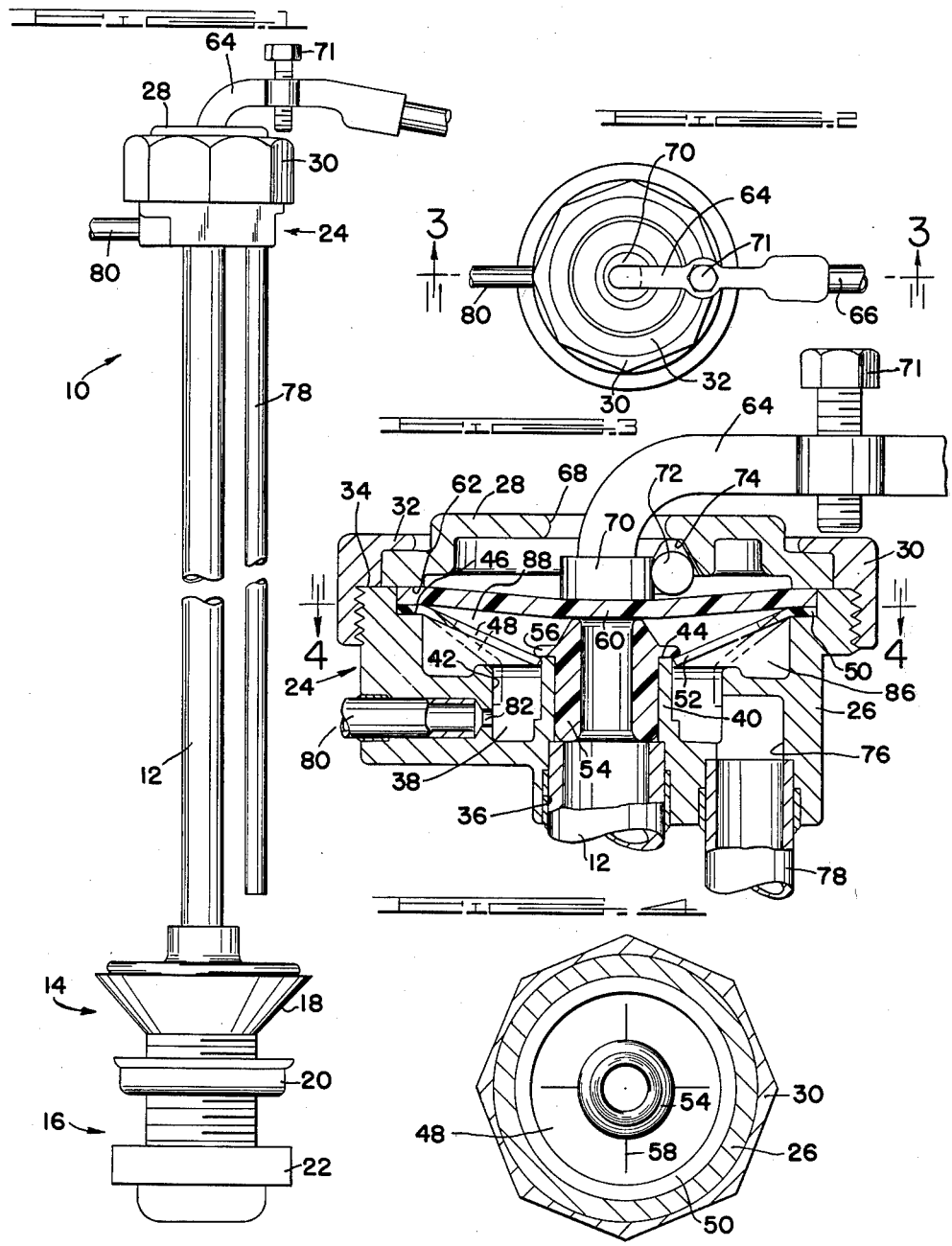
INVENTOR.
EDWARD FISCHER
BY
OLSEN AND STEPHENSON
ATTORNEYS Feb. 11, 1964 E. FISCHER 3,120,855
ANTI-SIPHON BALL COCK ASSEMBLY
Filed May 31, 1961 2 Sheets-Sheet 2
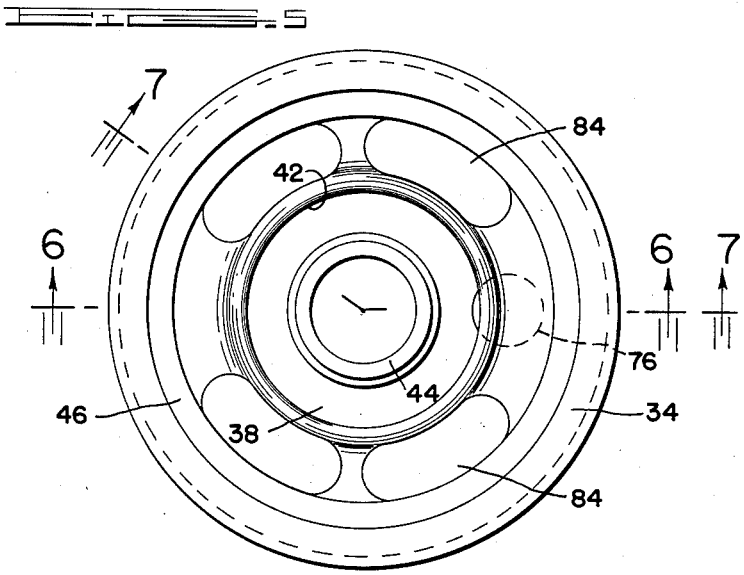
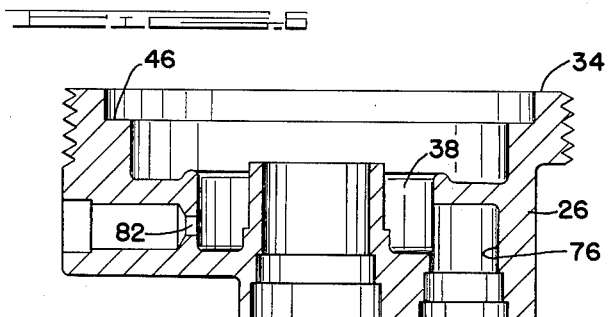
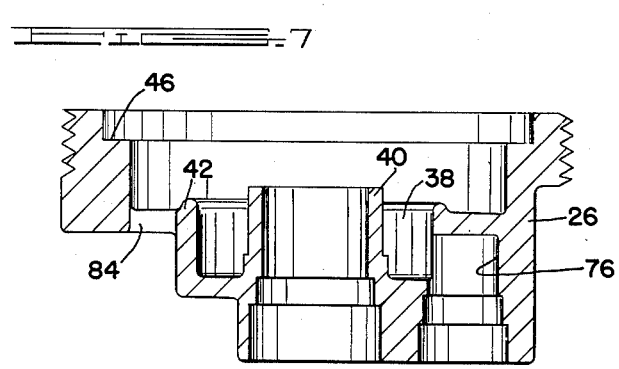
INVENTOR.
EDWARD FISCHER
BY
OLSEN AND STEPHENSON
ATTORNEYS

United States Patent Office 3,120,855
Patented Feb. 11, 1964

3,120,855
ANTI-SIPHON BALL COCK ASSEMBLY
Edward Fischer, Saline, Mich., assignor to Hoover Ball and Bearing Company, Ann Arbor, Mich., a corporation of Michigan
Filed May 31, 1961, Ser. No. 113,839
5 Claims. (Cl. 137—218)

This invention relates generally to ball cock assemblies for use in water closets and more particularly to an anti-siphon ball cock assembly which is an improvement over the assembly shown in United States Patent No. 2,869,571.

It is desirable, in ball cock assemblies, to provide an atmosphere break in the line of communication between the water inlet line and the outlet line which is immersed in the tank so that in the event of a suction in the inlet line stagnant water will not be drawn out of the tank into the inlet line so as to contaminate the water supply. This may be accomplished as shown in Patent No. 2,869,571, by providing openings to atmosphere in the valve casing through which the inlet and outlet lines are connected. A flapper valve is mounted in the casing so that it moves to a position preventing flow of water out of the openings to atmosphere when water is supplied to the casing through the inlet line for flow out the outlet line. When no water is being supplied to the casing, the flapper valve moves to a position in which the outlet line and the opening to atmosphere are in communication, so that in the event of suction in the inlet line, this suction cannot be transmitted to the outlet line so as to draw water out of the tank. In order to define this latter position of the flapper valve, a backup plate has previously been mounted in the valve casing. Such a plate not only adds to the cost of the assembly but is also likely to adversely affect the operation of the assembly in the event the flapper valve sticks or becomes bonded to the backup plate.

In prior assemblies, the flapper valve, the backup plate and the valve diaphragm which controls the discharge of water into the casing from the inlet line have been clamped between a pair of relatively movable parts which form the valve casing and which are connected by a nut. During installation of the assembly, if the nut is tightened excessively, the flapper valve may become deformed so the its operability is adversely affected, and if the nut is not tightened sufficiently both the flapper valve and the diaphragm may be pulled loose by the force of the water in the valve casing. Since the personnel installing the assembly must rely on the "feel" of the nut to know when it has been properly tightened, improper tightening is to be expected in many cases.

It is an object of this invention, therefore, to provide an improved anti-siphon ball cock assembly in which there are no parts which can interfere with movement of the flapper valve between its operative positions, and in which the flapper valve is constructed so that its resilience insures its movement between these positions.

A further object of this invention is to provide an improved anti-siphon ball cock assembly in which the flapper valve is engaged by other parts in the valve casing only at the radially inner and outer edges of the flapper valve, so as to eliminate any danger of the valve sticking.

Still a further object of this invention is to provide an anti-siphon ball cock assembly in which the flapper valve and the diaphragm are clamped between aligned portions of a pair of relatively movable parts in the valve casing which are spaced a predetermined distance apart irrespective of the amount of tightening of the assembly nut, to therefore insure a desired mounting of the valve and diaphragm in the casing.

Another object of this invention is to provide a ball cock assembly which is simple in construction and economical to manufacture.

Further objects, features and advantages of the invention will become apparent from a consideration of the following description, the appended claims, and the accompanying drawing in which:

FIGURE 1 is an elevation of the ball cock assembly of this invention;

FIGURE 2 is a plan view of the assembly shown in FIG. 1;

FIGURE 3 is a fragmentary vertical sectional view of the assembly of this invention looking substantially along the line 3—3 in FIG. 2;

FIGURE 4 is a reduced horizontal sectional view of the assembly of this invention looking substantially along the line 4—4 in FIG. 3, with the valve diaphragm removed;

FIGURE 5 is a top plan view of the bowl portion of the valve casing in the ball cock assembly of this invention; and FIGURES 6 and 7 are transverse sectional views of the bowl looking substantially along the lines 6—6 and 7—7 in FIG. 5.

With reference to the drawing, the ball cock assembly of this invention, indicated generally at 10, is illustrated in FIG. 1 as including an upright standpipe 12 having a connection 14 at its lower end which is adapted to be mounted in an opening in the bottom wall of a water closet or flush tank (not shown). The connection 14 includes a rubber gasket 18 and a nut 20 which is adapted to be tightened for clamping the bottom wall of the closet tightly between the gasket 18 and the nut 20. A second connection 16 below the connection 14 is adapted to be secured to a water inlet pipe (not shown), and includes a nut 22 which is utilized in securing the standpipe 12 to the water inlet line in a fluid-tight relation.

A valve casing 24 is mounted on the upper end of the standpipe 12 and includes a lower portion 26, hereinafter referred to as the bowl, and an upper portion 28, hereinafter referred to as the top wall member for the casing 24. A union nut 30 is threaded onto the upper end of the bowl 26 and has an inwardly directed annular flange portion 32 which engages the top wall member 28 and forces it into tight engagement with the upper end surface 34 of the bowl 26. The bowl 26 has an opening 36 in its bottom wall in which the open upper end of the standpipe 12 is positioned. The bowl 26 is also formed with an annular trough or chamber 38 which is substantially coaxial with the standpipe 12 and is defined by a radially inner wall 40, which constitutes tubular upward extension of the standpipe 12, and a radially outer wall 42. As shown in FIG. 3, the upper end 44 of the inner wall 40 is below the level of the top surface 34 of the bowl 26. Intermediate the upper end 44 of the wall 40 and the surface 34, the bowl 26 is formed with an annular horizontal shoulder 46 which is spaced a predetermined distance below the surface 34. An annular flapper valve 48, which is formed of a resilient material such as rubber, has its radially outer edge portion 50 supported on the shoulder 46 and its radially inner edge portion 52 inclined downwardly and inwardly across the upper end of the chamber 38 as shown in full lines in FIG. 3.

A valve seat member 54 of a tubular shape, and illustrated as being formed of a plastic material, is frictionally supported within the opening formed by the chamber wall 40 and has a radially outwardly projecting flange or lip 56 which is engaged with the upper end 44 of the chamber wall 40 and projects radially outwardly beyond the wall 40 so that it extends above the chamber 38. As shown in FIG. 3, the flapper valve 48 is installed so that the radially inner edge portion 52 thereof engages the under side of the lip 56 to prevent travel of the flapper valve 48 to the substantially horizontal position that it tends to assume by virtue of its resilience. As shown in FIG. 4, the flapper valve 48 is provided with four equally spaced radially extending slits or cuts 58 which extend radially outwardly from the inner edge of the flapper valve and terminate short of the radially outer edge portion 50 of the flapper valve, to facilitate flexing movement of the flapper valve 48 in an axial direction.

A rubber valve diaphragm 60, of circular shape, extends across the interior of the valve casing 24 and is supported on the radially outer edge portion 50 of the flapper valve 48 as shown in FIG. 3. The diaphragm 60, which is of a substantially uniform thickness, and the outer edge portion 50 of the flapper valve 48 are of a combined thickness slightly greater than the distance between the top surface 34 of the bowl 26 and the shoulder 46. Consequently, when the casing top wall member 28 is moved into engagement with the bowl top surface 34, on tightening of the nut 30, the outer edge portions of the flapper valve 48 and the diaphragm 60 are clamped between the bottom surface 62 of the top wall member 28 and the shoulder 46.

The diaphragm 60 is adapted to be depressed into engagement with the upper end of the valve seat 54 by a one-piece lever 64 which is connected at one end to a float arm 66 that carries the usual float (not shown) that moves upwardly in the tank as the tank is filled. At its opposite end, the lever 64 projects downwardly through an opening 68 in the casing top wall member 28. The lever 64 is formed at its terminal end with a cylindrical actuating portion 70 engageable with the diaphragm 60, on pivotal movement of the lever 64 in one direction, to seat the diaphragm 60 on the seat 54. Pivotal movement of the lever 64 in the opposite direction, to permit unseating of the diaphragm 60 by the water pressure in standpipe 12, is limited by engagement of an adjustable travel limit screw 71 carried by the lever 64 with the union nut 30. A trunnion rod 72 is secured to the actuating portion 70 and is disposed in a groove 74 formed in the underside of the top wall member 28 at a position substantially tangent to the opening 68. The groove 74 is of a size such that it provides a journal in which the trunnion rod 72 can pivot.

The bowl 26 is formed with a discharge opening 76 which communicates with a downwardly extending hush tube 78 mounted on the lower side of the bowl 26. As shown in FIGS. 3, 5 and 6, the opening 76 communicates with the lower end of the chamber 38 on the radially outer side thereof. A refill tube 80 is mounted on one side of the bowl 26 and communicates through an opening 82 in the bowl with the chamber 38 for delivering water to the toilet bowl during flow of water from the standpipe 12 into the valve casing 24.

As shown in FIGS. 5 and 7, the bottom wall of the bowl 26 is formed with four arcuate openings 84 which are concentric with the standpipe opening 36 and are positioned radially outwardly of the chamber 38. The valve casing 24 is positioned in the flush tank above the water line in the tank so that the openings 84 communicate with atmosphere. As a result, when the openings are in communication with the outlet opening 76, a vacuum condition cannot be created at the opening 76 so as to draw water out of the tank through the hush tube 78 and into the casing 24. As shown in FIGS. 3 and 7, the openings 84 communicate with a chamber 86 formed in the valve casing 24 above the chamber 38 and below the flapper valve 48. Consequently, when the flapper valve 48 is in its position shown in full lines in FIG. 3, the chambers 38 and 86 are in communication so that the openings 884 to atmosphere are likewise in communication with the outlet opening 76.

In the operation of the anti-siphon ball cock assembly 10 of this invention, when the water level in the tank is below a level at which the float rod 66 maintains the lever 64 in a position in which the actuating portion 70 holds the diaphragm 60 in engagement with the upper end of the valve seat 54, water from the standpipe 12 flows into the casing 24, moves the diaphragm 60 upwardly off the seat 54 and moves the flapper valve 48 downwardly to its position shown in broken lines in FIG. 3 in which it is pressed into conformity with the outer wall 42 of the chamber 38. In this position of the flapper valve 48, water from the standpipe 12 flows into the chamber 38 and out of the chamber 38 through the outlet opening 76 and the hush tube 78 into the tank and through the opening 82 into the refill tube 80 for refilling the toilet bowl.

As the tank is being refilled above a predetermined level and to a lever approaching a desired final level, the lever 64 moves the diaphragm 60 toward the valve seat 54 to progressively reduce the volume of water flowing from standpipe 12 into the chamber 38. When this flow of water has been reduced sufficiently, the resilience of the flapper valve 48 provides for its return movement to the position shown in full lines in FIG. 3, in which the radially inner edge portion 52 engages the lip 56 which functions as a stop to define this position of the flapper valve. Water continuing to flow from the standpipe 12 then fills the chamber 38 between the flapper valve 48 and the diaphragm 60 so as to create a pressure on the diaphragm 60 opposing movement thereof to a seated position on the seat 54. Some of this water in the chamber 88 leaks past the valve 48 into the flush tank so that the float on the arm 66 continues to rise but it becomes immersed deeper in the tank because the resistance to pivotal movement of the lever 64 is increased by the pressure of the water in chamber 88. When the buoyant force on the float is sufficient to overcome the pressure in the chamber 88, the diaphragm is quickly moved onto the seat 56. Thus a snap action is obtained for the diaphragm 60, as a result of the action of the flapper valve 48, and this snap action is desirable because it eliminates the usual prolonged leak of water into the flush tank which occurs at the end of each flushing action.

In the solid line position of the flapper valve 48, the openings 84 to atmosphere communicate with the outlet opening 76 so that in the event a suction is created in the standpipe 12, this suction cannot be transmitted to the outlet opening 76 so as to draw water out of the hush tube 78 into the valve casing 24. It can thus be seen that the outlet openings 84 constitute an atmospheric break in the line of communication between the standpipe 12 and the hush tube 78 so as to positively preclude any withdrawal of water from the tank through the hush tube.

From the above description it is seen that this invention provides a ball cock assembly 10 in which there are no parts to impede the movement of the flapper valve 48 between the two positions shown in FIG. 3. Since the flapper valve 48 is engaged by other parts in the casing 24 only at its radially inner and outer edges, it is free to continuously move between these two positions. The slits 58 affect this free movement of the flapper valve 48, since without the slits 58 there is danger that the valve 48 will become locked in its broken line position (FIG. 3) thereby permitting siphoning of water out of the hush tube 78. As shown in FIGS. 3 and 4, each slit 58 terminates at its radially outer end at a point between the chamber wall 42 and the radially outer edge portion 50 so that the valve 48 retains its annular configuration. As a result, the resilient tendency of the valve 48 to assume a flat position in a substantially horizontal plane insures its return from the broken line to the full line position when the flow of water into chamber 38 is reduced.

In its position shown in broken lines in FIG. 3, the flapper valve 48 prevents a substantial flow of water from the standpipe 12 out the openings 84, which causes an objectionable noise during refilling of the tank, and in its full line position it provides the desired connection of the openings 84 and the outlet line 76.

The distance between the shoulder 46 and the under side 62 of the top wall member 28 determines the amount of pressure which is applied to the diaphragm 60 and the flapper valve member 48 to clamp these parts in the valve casing 24. As a result, the valve casing 24 can be manufactured so that this distance is maintained within predetermined tolerances to thereby assure a predetermined clamping pressure on the flapper valve 48 and the diaphragm 60 to preclude the possibility of a faulty installation.

It will be understood that the anti-siphon ball cock assembly which is herein disclosed and described is presented for purposes of explanation and illustration and is not intended to indicate limits of the invention, the scope of which is defined by the following claims.

What is claimed is:

1. In an anti-siphon ball cock assembly which includes an upright standpipe and a valve casing, said casing including a bowl mounted on the upper end of said standpipe and having an annular chamber provided with radially spaced inner and outer walls, a tubular valve seat member disposed concentrically within said chamber inner wall and communicating with said standpipe, said bowl having an upper end surface positioned above and radially outwardly of said chamber and a substantially horizontal shoulder disposed below and radially inwardly of said upper end surface, said bowl having a water outlet communicating with said chamber below the upper end thereof and an opening to atmosphere located radially outwardly of said chamber, an annular flapper valve formed of a resilient material and having a radially outer edge portion supported on said shoulder, a diaphragm supported on said radially outer edge portion of said flapper valve for movement into engagement with the upper end of said seat member, a top wall member for said casing supported on the upper end surface of said bowl in engagement with said diaphragm at a position in vertical alignment with said shoulder, a nut threadably mounted on said bowl and engaged with said top wall member for maintaining said top wall member in engagement with said top bowl surface in a position in which the diaphragm and the flapper valve are clamped between said top wall member and said shoulder, stop means on said seat member projecting radially outwardly adjacent the upper end of said chamber for engagement with the inner edge portion of said flapper valve to define a position of said flapper valve in which said chamber communicates with said opening, said flapper valve inner edge portion being provided with a plurality of slits which extend radially outwardly from said inner edge portion beyond the radially outer edge of said chamber and being movable downwardly in response to a flow of water into said bowl from said seat member to a position in which said flapper valve engages the radially outer edge of said chamber so as to block communication of the chamber and said opening and provide for communication of said chamber with said seat member and said outlet.

2. In an anti-siphon ball cock assembly which includes a valve casing, said casing including a bowl having an annular chamber provided with an open upper end adapted to be supplied with water, said bowl having an upper end surface positioned above and radially outwardly of said chamber and a substantially horizontal shoulder disposed below and radially inwardly of said upper end surface, said bowl having a water outlet communicating with said chamber below the upper end thereof and an opening to atmosphere located radially outwardly of said chamber and below said shoulder, an annular flapper valve formed of a resilient material and having a radially outer edge portion supported on said shoulder, and a plurality of radial slits which extend radially outwardly from the inner edge thereof and terminate in a spaced relation with said outer edge portion, a diaphragm supported on said radially outer edge portion of said flapper valve, a top wall member for said casing supported on the upper end surface of said bowl in engagement with said diaphragm at a position in vertical alignment with said shoulder, and means extending between said bowl and said top wall member for maintaining said top wall member in engagement with said top bowl surface in a position in which the diaphragm and the flapper valve member are clamped between said top wall member and said shoulder, said flapper valve being movable between a position in which it extends radially inwardly across the upper end of said chamber and a position in which it extends into said chamber and is spaced from the radially inner side thereof.

3. In an anti-siphon ball cock assembly which includes a valve casing, said casing including a bowl having an annular chamber provided with radially spaced inner and outer walls and an open upper end adapted to be supplied with water, said bowl having a water outlet communicating with said chamber below the upper end thereof and an opening to atmosphere located radially outwardly of said chamber, an annular flapper valve formed of a resilient material and having a radially outer edge portion mounted on said casing at a position above said opening and above the upper end of said chamber, said flapper valve being inclined downwardly and radially inwardly from said outer edge portion across the upper end of said chamber, means on said casing extending radially outwardly at the upper end of said inner wall and spaced from said outer wall for engagement with the inner edge portion of said flapper valve to prevent movement thereof above said upper end of the chamber, said flapper valve being provided with a plurality of spaced radial slits which extend radially outwardly from the inner edge thereof and terminate in a spaced relation with said radially outer edge portion thereof to facilitate downward flexing movement of said valve to a position in which the inner edge thereof is adjacent said outer wall and spaced from said inner wall.

4. In an anti-siphon ball cock assembly which includes an upright standpipe, a valve casing mounted on the upper end of said standpipe and having an annular chamber adapted to be supplied with water flowing from said standpipe in a direction radially outwardly and downwardly relative to said chamber, a diaphragm valve member mounted on said casing for flexing movement toward and away from a position shutting off said flow of water, said casing having a water outlet opening communicating with said chamber and an opening to atmosphere located radially outwardly of said chamber; and annular flapper valve disposed below said diaphragm valve member so that an unobstructed space is provided in said casing therebetween, said flapper valve having the radially outer edge thereof mounted on said casing so that the radially inner edge thereof projects toward said chamber, said flapper valve being movable between a first position in which it engages the radially outer side of said chamber so as to be positioned between said chamber and said opening to atmosphere, and a second position in which it extends to the radially inner side of said chamber and is out of a path of communication between said water outlet and said opening to atmosphere, and means in said casing engageable only with a portion of said flapper valve at the inner peripheral edge thereof defining said second position.

5. In an anti-siphon ball cock assembly which includes a valve casing having a water inlet and and a water outlet positioned to one side of said inlet and an opening to atmosphere positioned to one side of said outlet; a diaphragm valve member mounted on said casing for movement toward and away from said inlet, an annular flapper valve mounted in said casing in a surrounding relation with said inlet and disposed below said diaphragm valve member so that an unobstructed space is provided in said casing therebetween, said flapper valve having radial slits therein extending radially outwardly from the inner periphery thereof and being secured at its outer periphery to said casing for flexing movement between a first position in which it is to one side of a path between said outlet and said opening and a second position to one side of a path between said outlet and said inlet and in the path of communication between said inlet and said opening, said flapper valve being formed of a resilient material and being mounted on said casing so that it is urged toward said first position, and means in said casing engageable only with the inner periphery of said valve member for defining said first position thereof.

References Cited in the file of this patent
UNITED STATES PATENTS

| | | |
|---|---|---|
| 2,779,350 | Owens | Jan. 29, 1957 |
| 2,869,571 | Price | Jan. 20, 1959 |
| 2,875,977 | Stone | Mar. 3, 1959 |
| 2,897,835 | Philippe | Aug. 4, 1959 |